Figure 1:
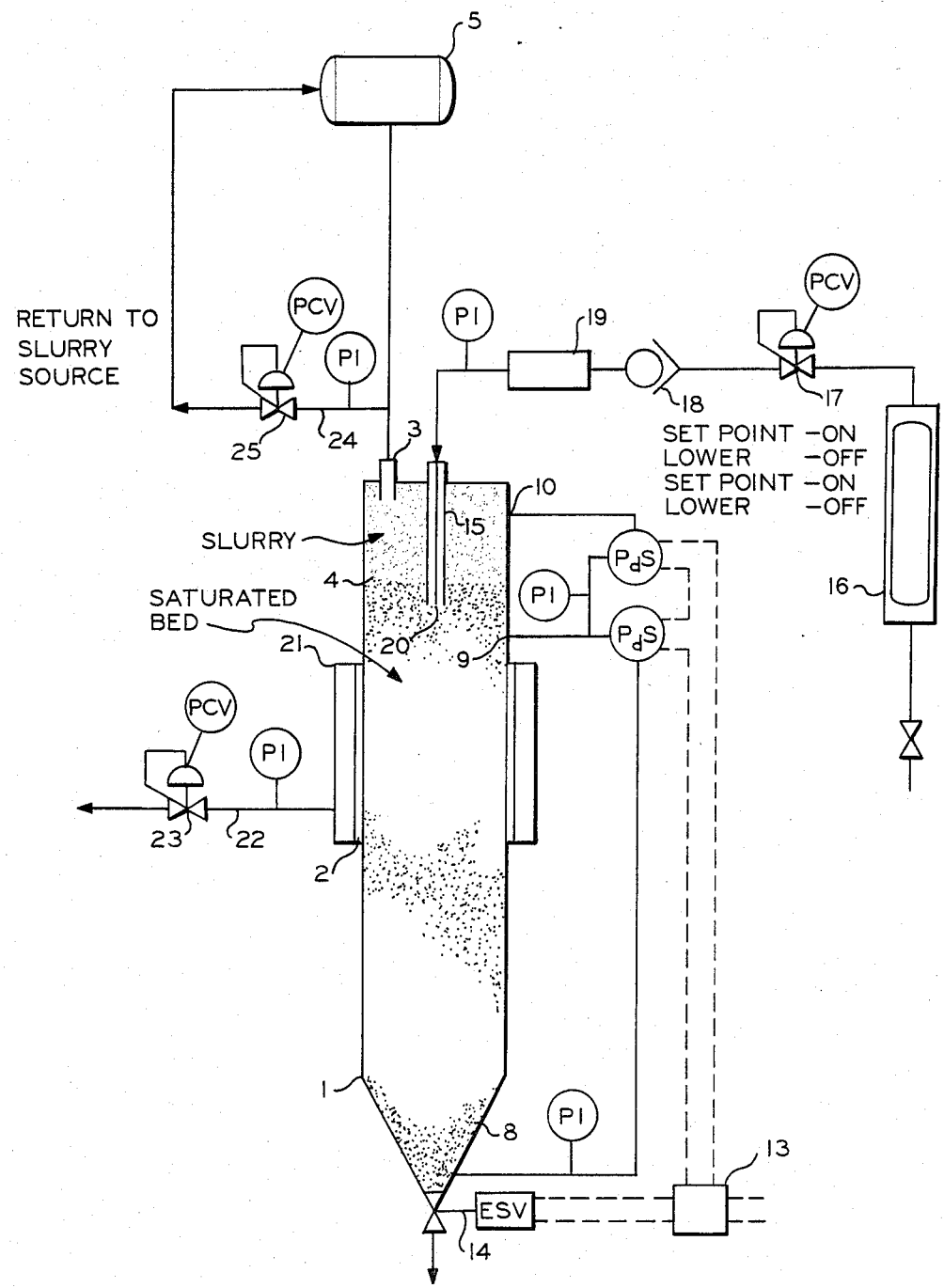

United States Patent [19]

Seefluth

[11] Patent Number: 4,526,684
[45] Date of Patent: Jul. 2, 1985

[54] POLYMER SLURRY WASHING

[75] Inventor: Charles L. Seefluth, Bartlesville, Okla.

[73] Assignee: Phillips Petroleum Company, Bartlesville, Okla.

[21] Appl. No.: 531,568

[22] Filed: Sep. 13, 1983

Related U.S. Application Data

[62] Division of Ser. No. 269,206, Jun. 2, 1981, Pat. No. 4,421,874.

[51] Int. Cl.³ ............................................. B01D 29/00
[52] U.S. Cl. .................................... 210/104; 210/110; 210/190; 210/407
[58] Field of Search ............... 210/108, 110, 114, 116, 210/190, 268, 296, 407, 103–105

[56] References Cited

U.S. PATENT DOCUMENTS

| 3,199,676 | 8/1965 | May | 210/114 |
| 3,661,260 | 5/1972 | Koga et al. | 210/110 X |
| 3,878,096 | 8/1975 | Somogyi | 210/110 |
| 4,336,143 | 6/1982 | Abbott | 210/110 X |

Primary Examiner—Thomas Wyse

[57] ABSTRACT

A polymer slurry is passed past a filter and a wash fluid is caused to flow at a substantial angle with respect to the flow of the polymer slurry and toward the filter such as to replace at least a substantial portion of the fluid of the polymer slurry.

8 Claims, 2 Drawing Figures

POLYMER SLURRY WASHING

This is a divisional application of the copending patent application Ser. No. 269,206, filed June 2, 1981, U.S. Pat. No. 4,421,874.

This invention relates to a process and apparatus for the washing of polymer slurries, more specifically the invention relates to the purification of slurries of polymers such as polyolefins, e.g. polypropylene, poly(arylene sulfides), e.g. poly(phenylene sulfide) (PPS) and the like.

BACKGROUND OF THE INVENTION

Reactor effluents from polymerization processes comprising, for example, polypropylene can contain polymer particles, dissolved amorphous polymer, catalyst residues, and diluent, e.g. liquid propylene, and liquid polymer. It is frequently necessary to remove one or more of these materials, e.g. soluble polymer from the desired product, e.g. the crystalline polymer, in order to obtain a product having acceptable physical properties, e.g. stiffness, tensile strength, etc. In addition, catalyst residues often must be substantially removed to minimize corrosion of subsequent processing equipment, e.g. extruders, to minimize discoloration of the finished polymer and to reduce the quantity of stabilizer package required to protect the finished polymer from the deleterious effects of heat, oxygen and UV light.

Polymerization reactor effluents comprising PPS, for example, can contain polymer particles, unreacted p-dichlorobenzene, N-methyl-2-pyrrolidone (NMP) solvent and salt (NaCl). Roughly the same amount of salt and polymer is made in this process. It is necessary to wash as much salt as possible from the polymer as well as other ash-forming by-products in order to obtain a commercially acceptable product. Generally, before this is done, the NMP and p-dichlorobenzene are removed by flashing and the product is slurried in water, filtered, reslurried, etc. to remove the salt.

THE INVENTION

It is, thus, one object of this invention to provide a process for the purification of a polymer slurry.

Another object of this invention is to provide a process wherein a polymer slurry is subjected to a washing operation.

Yet a further object of this invention is to provide a process for both purifying and concentrating a polymer slurry.

Still another object of this invention is to provide an apparatus for carrying out the process of this invention.

Figure 2:
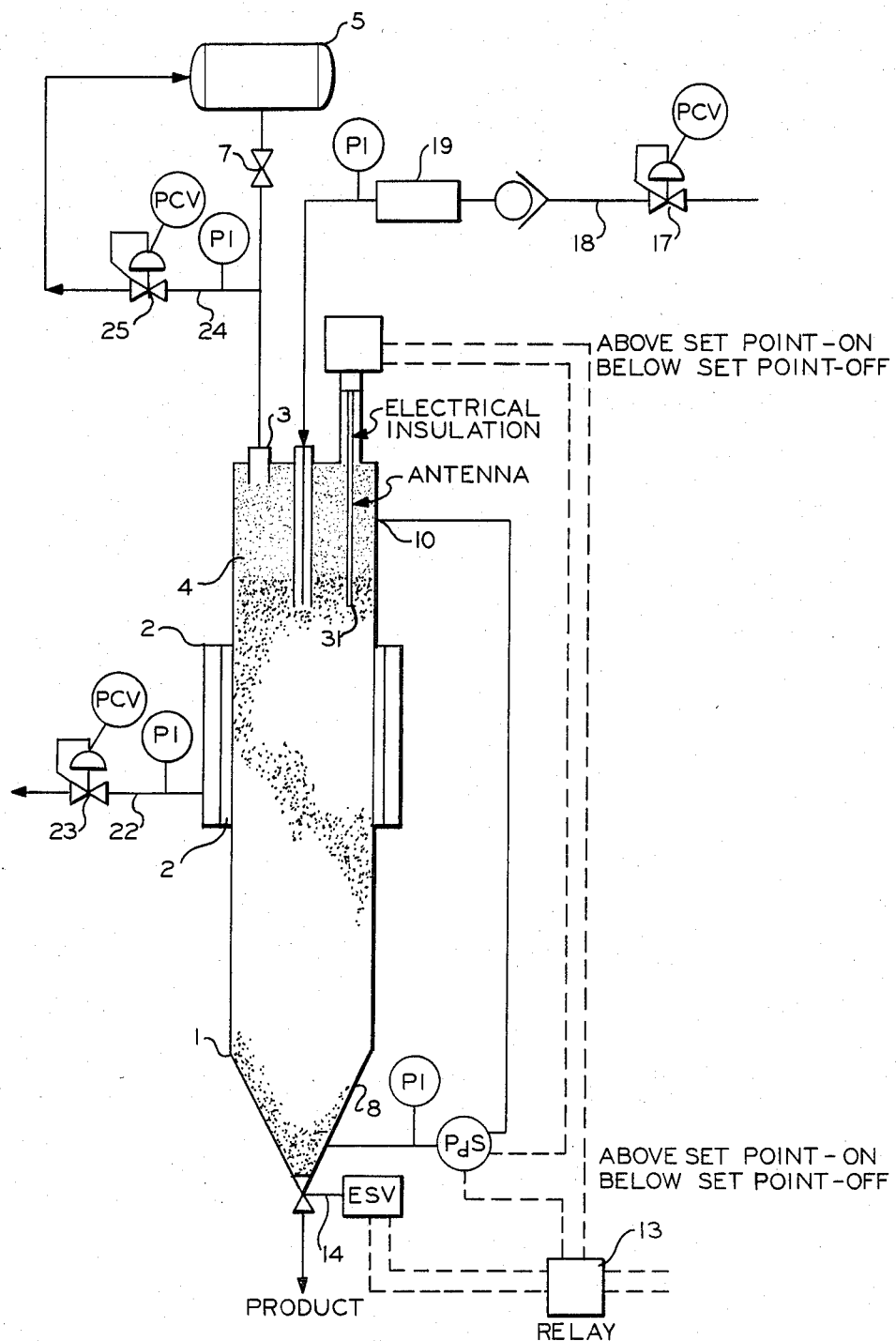

These and other objects, advantages, details, features and embodiments of this invention will become apparent to those skilled in the art from the following detailed description of the invention, the appended claims and the drawing in which FIG. 1 is a schematical representation of an apparatus for carrying out the process of this invention, FIG. 2 is a similar representation as FIG. 1 with a different control mechanism.

In accordance with this invention a process for purifying a polymer slurry is provided which can be generically characterized as a cross extraction process. In this process the polymer slurry is moved within a housing preferably in a settled bed plug flow state in a first direction past a filter material allowing the fluid of the slurry to pass through and essentially preventing substantial quantities of the polymer particles to pass through. A wash fluid is injected into the slurry and caused to flow at a substantial angle to the direction of movement of the slurry through the housing. Thereby the wash fluid replaces the fluid phase of the slurry or at least a substantial portion thereof. This process differs from regular washing or extraction operations in that the washing fluid in accordance with this invention flows neither concurrently nor countercurrently with the slurry but rather flows across the movement of the slurry through the wash column. The movement of the slurry can in fact be achieved continuously or discontinuously. The relationship between the flow directions pointed out are the same in both instances namely that a substantial angle exists between the flow of the wash fluid from the wash fluid inlet to the filter in the housing and the direction of the macroscopic flow of the polymer slurry.

Thus in accordance with a first embodiment of this invention a process for the purification of a polymer slurry is provided. The polymer slurry comprises solid polymer particles and a fluid phase containing a liquid. The fluid phase contains at least one ingredient to be at least partially removed from the slurry. The slurry is moved predominantly in a first direction continuously or discontinuously through a housing which is confined by a wall. This wall comprises at least one filter portion. In this filter portion the wall is made out of a filter material permitting the fluid phase to pass through while preventing any substantial amount of solid polymer particles from passing through. A wash fluid is injected into said housing at a location and under pressure conditions such as to cause a flow of the wash fluid in a second direction through the slurry. Thereby the wash fluid replaces at least a portion of the fluid phase by the wash fluid and causes this replaced portion of the fluid phase to leave the housing through the filter. Preferably most of the fluid phase of the liquid/solid mixture is replaced by the wash fluid; the wash fluid is then employed in a volume ratio with respect to the fluid phase of 1:1 or slightly higher. The wash fluid generally contains none of said one ingredient or a substantially less amount of the ingredient to be replaced than the polymer slurry. The first and second flow directions form a substantial angle with each other. This angle macroscopically will be preferably in the range of 40° to 90°; the angle between the two flow directions is here always expressed as an angle of 90° or less. The purified polymer slurry is finally recovered as the product of the process from the housing. The purified polymer slurry comprises the solid polymer particles and a purified liquid phase containing substantially less of the at least one ingredient mentioned above as compared to the fluid phase of the starting polymer slurry.

It is particularly preferred to carry out the process in such a way as to establish a settled bed of the polymer slurry and in contact therewith a settling slurry within the housing. The area between the settled bed (or saturated bed) and the settling slurry should be kept upstream of the filter portion of said wall. The terms "downstream" or "upstream" refer to the flow of the settled bed, and thus generally to the axial flow of the slurry through the housing. The settling of the bed of the polymer slurry is preferably achieved by liquid flow from the slurry through the bed, but may be enhanced by settling due to differences in specific gravity between the fluid and the polymer particles.

In a preferred embodiment of this invention the pressure conditions in the housing are determined. Responsive to this determination the purified polymer slurry is removed from the housing. This control operation is best carried out by determining the pressure at least in the portion of the column downstream of the filter portion.

Another advantageous possibility to control the process of this invention resides in the step of detecting and sensing the location of the area between the settled bed of the polymer slurry and the settling slurry. The withdrawal of the settled bed is preferably controlled responsive to the determination of this area location. The location of the boundary area between the settled bed and the settling slurry is determined preferably either by pressure difference measurements or by means of a radio-frequency level controller.

Yet another embodiment of this invention resides in an apparatus for carrying out the process described above. This apparatus comprises an essentially cylindrical housing confined by a wall. Preferably this housing will have a circular cross-section. At least one filter portion is arranged within said wall; the filter portion will be of the characteristic described above in connection with the process. A filtrate receiver chamber is associated with each filter portion. In the preferred embodiment the housing is provided with one filter portion and one filtrate receiver chamber. If a plurality of filter portions are used along the housing it is preferred to have a filtrate receiver chamber individually associated with each filter portion. The apparatus of this invention is further provided with an inlet conduit for a wash fluid which is provided with a wash fluid outlet. For each axially displaced filter portion a separate wash fluid outlet is provided for. The wash fluid outlet is arranged within said housing so that the wash fluid flowing toward the respective filter will flow under the angle described above with respect to the main flow direction of the polymer slurry. A polymer slurry removal conduit is associated with the lower end of the housing. Preferably in this slurry removal conduit a control valve is arranged with allows the controlled withdrawal of the slurry.

For safe operation of the apparatus it is preferred that there is a wash fluid pressure controller associated with the inlet conduit for the wash fluid as well as a filtrate pressure controller associated with the filtrate receiver chamber, such as to insure a constant pressure differential between the wash fluid outlet and the filter.

The present invention is applicable to a wide variety of polymer slurries. Slurries of polyolefins and poly(arylene sulfides) are presently preferred. The particle size of the solid polymer particles in the slurry is not particularly critical. However, the invention is most desirable in cases where the polymer slurries involve very small polymer particles, such as slurries wherein more than 50 weight percent of the total solid polymer has a particle size of 100 microns or less.

As pointed out above, it is presently preferred that the process of this invention involves both a cross extraction and a settling of the polymer slurry. This can also be expressed in fluid content of the slurry. Since all the fluids injected by means of the slurry and by means of the wash fluid must equal the total quantity of fluids withdrawn from the filtrate receiver chamber and with the produced settled bed, the preferred embodiment of this invention resides in a process where the total quantity of fluids withdrawn via the purified polymer slurry is substantially less than the total quantity of fluids contained in the slurry injected into the housing. More specifically yet, the settling concentration of the solid polymer particles in the slurry is such that the product slurry i.e. the settled bed or concentrated slurry preferably contains at least about 1.3 times, and preferably at least 1.5 times the quantity of solid polymer particles in the feed slurry volume.

The column will be operated under balanced positive pressures which are regulated with pumps, flow control valves, pressure regulators, sensing devices, etc., which are known in the art. For reasons of safety, economy and convenience the maximum pressure generally will not exceed about 100 psia (0.69 MPa) and can preferably range from about 20 to about 75 psia (0.14–0.52 MPa). The pressures employed in the various locations of the column will vary as to be described in more detail later.

The column can be operated over a reasonable span of temperatures providing essentially liquid phase conditions exist which will depend upon the nature of the slurry components and wash liquids employed. With the polypropylene reactor effluent previously mentioned, for example, a temperature ranging from about 20° to about 150° C. can be used. With a PPS-water slurry the temperature can range from about 20° to about 200° C.

The nature of wash liquids employed will depend upon the type of slurry to be treated and will generally be conventional in nature, e.g. water, hydrocarbons such as n-hexane, propylene, etc., ketones such as acetone, alcohols such as methanol and epoxy compounds such as propylene oxide. Preferably the wash fluid is the same liquid that is present as the liquid phase of the slurry but is essentially free of the product to be removed, such as catalyst residues or liquid polymers or amorphous polymers.

Thus, for example, the polypropylene reactor effluent and the PPS-salt-water slurry can be treated in the apparatus of the invention to wash out soluble components through an annular filter or filters located approximately in the center of the column. Excess slurry liquid passes through the bed and out the filter leaving particles trapped at the interface. The formation of the dense phase takes place at an interface area above the filter and above the wash outlet; from this interface area down the flow of the solid/fluid mixture can be characterized as plug flow. The purified, concentrated slurry is preferably intermittently withdrawn in pulses from the column bottom to avoid upsetting the vertical pressure differential. The total volume of slurry and wash liquid admitted to the column will be sufficient to maintain the height of settled bed at a generally constant level above the wash inlet.

The feed slurry moves axially along the column; the liquid flows through the interface between the slurry and the settled bed, and flows through the settled bed. The wash fluid passes from the wash fluid outlet (which is the inlet for the wash fluid into the column) to the filter and thereby displaces the slurry fluid (sometimes called mother liquor), which leaves the column through the filter. The volume of wash fluid injected is preferably sufficient to replace all of the slurry fluid. The volume flow rate of the wash fluid is thus equal to or larger than the volume flow rate of the liquid filled space between the polymer particle in the settled bed.

In the embodiments of the invention shown in FIGS. 1 and 2, a column 1 is employed containing an annular filter zone 2 for washing of the slurry with suitable instrumentation to permit automatic operation. The column can possess any height to diameter ratio which permits the desired washing and settling features to occur. Generally, the ratio can range from about 3.5:1 to about 10:1. Ratios in the range of about 4:1 to about 5:1 are presently preferred for reasons of economy as well as efficiency.

The column size will be dependent upon the production rate desired. For example, for about a 20 lbs/hour (9.1 kg/hr) production rate, a column of about 18 inches high and 4 inches in diameter 45.7 cm × 10.2 cm) having a height to diameter ratio of about 4.5:1 can be employed. For a production rate of about 9000 lbs/hour (4100 kg/hr), a column about 18 feet high and 4 feet in diameter (5.5 × 1.2 m) can be employed.

One or more annular filter zones 2 can be employed with the column 1. Generally, one zone is preferred to simplify the flow pattern of the wash liquid and to avoid the problem of wash effluent reentering the column that can occur with multiple filter zones and upsets in the pressure.

The length of the filter zone can vary from about ¼ the column diameter to about 1.5 times the column diameter depending to some extent upon the nature of the slurry employed. It is found that a length about equal to one column diameter gives acceptable results.

The location of the filter zone is dependent to some extent upon the nature of the slurry employed and the sensitivity of the control devices used in regulating the height of the slurry in the column. Acceptable results can be obtained with a filter zone positioned such that its top terminates from about 0.5 to about 1 times the column diameter below the maximum height of the settled bed in the column.

The tube through which the wash liquid enters the column is sized to provide the quantity of liquid required. For example, a tube 1 inch (2.5 cm) in diameter can be employed with a 4 inch (10.2 cm) diameter column and a tube 12 inches (30.5 cm) in diameter can be employed with a column 4 feet (1.2 m) in diameter. The tube enters the column at a convenient location above the uppermost level of the contained liquid to avoid disrupting plug flow of the slurry, extends downwardly in the column center and can terminate near the top area of the filter zone or at some intermediate location near the bottom of the filter zone. In the latter instance, the tube bottom can be sealed and the wash liquid expelled radially outward through porous walls or the like in the vicinity of the filter. In the first instance, the tube bottom is open and the walls can be solid or porous for several tube diameters from its lower end.

The quantity of wash liquid employed will be equivalent in volume to the amount of filtrate exiting the filter zone and of course is dependent upon column size and nature of the slurry preferably the volume of wash liquid will be equal to or slightly larger than the fluid of the slurry replaced. The volume of filtrate is preferably equal to that of the liquid in the entering slurry. The wash liquid advantageously is at least equal in volume to that in the product and preferably should be in slight excess. The original liquid in the entering slurry flows mostly out of the top portion of the filter. The slight excess of wash liquid (if any) leaves mostly near bottom of filter. The wash liquid can be supplied manually or automatically to the column by using suitable measuring and supplying means known in the art such as pumps, flow control devices, rotameters, etc.

The slurry enters the column at a convenient location 3 above the uppermost level 4 of the settled bed contained in the slurry filled column. It is supplied on demand from a pressurized supply 5 when the supply pressure exceeds that in the column after a pulse of washed, concentrated slurry passes from the column 1 via conduit 6. A pressure control valve 25 controls the flow of slurry. When the pressure of the entering slurry in inlet 3 exceeds the pressure desired in column 1, a pressure control valve 25 opens to allow the entering slurry to be at least partially or completely returned to the slurry source by way of conduit 24.

The control mechanism of this process and apparatus constitutes another, preferred embodiment of this invention. As shown in FIG. 1 the pressure of the column is detected near the bottom of the column at a location 8. The pressure is also measured in the column above and below the level 4 of the settled bed, namely at locations 9 and 10. In the drawing "P1" is intended to indicate pressure display and/or pressure recorder units. The three pressure signals are converted into two pressure difference signals in units 11 and 12 and these pressure difference signals are transmitted to a relay 13. This relay 13 opens or closes the product slurry valve 14 in the product line 6.

The wash fluid is injected into the wash column via conduit 15. The wash fluid is withdrawn from a fluid supply not shown via a flow controller or rotameter 16. The wash fluid is passed through a pressure control valve 17, a backflow check valve 18 and a cartridge filter 19.

The locus 20 of wash fluid discharge is located approximately at the upper end of the annular filter 2. The wash fluid is discharged at a pressure significantly above the pressure in the filtrate collecting chamber 21. This filtrate collecting chamber 21 surrounds the annular filter 2. The wash fluid thus passes from the orifice 20 through the slurry and replaces the slurry fluid by the wash fluid. The slurry fluid leaves the column 1 through the filter 2 via a conduit 22 which is operated under controlled pressure by means of a pressure control valve 23.

The main difference in the apparatus shown in FIG. 2 and that shown in FIG. 1 resides in the means of detecting the level of the settled bed. In the apparatus of FIG. 2 a radio-frequency level controller 30 is shown which has an antenna 31 and which generates a signal representative of the location of the saturated bed level 4 in the housing. This signal together with a pressure difference signal are used to operate the relay 13 which in turn actuates the product valve 14. The pressure difference signal is representative of the pressure difference between the pressure in the bottom of the column at location 8 and the pressure in the top of the column at location 10.

EXAMPLE

A slurry consisting of 25 wt. % solids, namely salt (NaCl) filled PPS, and water was charged to a glass column 4 inches in diameter and 18 inches in height as schematically shown in the drawing. The glass column was filled with the slurry and pressured and the water flow was adjusted by manually throttling valves and observing pressure indicators and a flow meter on the wash inlet. With a bed level established, and an effluent flow established, the product valve was periodically opened to allow plug flow to lower the bed level in 0.5 inch increments. To draw product in this manner, it was necessary to have a pressure of at least 30 psig at the bottom of the column. This minimum pressure is a function of the characteristics of the slurry and the ratio of valve size to column diameter. This minimum pressure becomes the basis for setting the other pressures since it drops when the product valve is opened and must recover before product can be taken again. The recovery of pressure is not instantaneous through a settled bed and may take 10 to 40 seconds. The pressure on the effluent side of the filter must be at least as high as the product valve pressure and the top of the column pressure must be high enough above the effluent pressure to provide flow through the porous settled bed and the filter. It is then necessary to set the wash inlet pressure slightly above the slurry inlet pressure and adjust wash flow rate to an appropriate ratio with effluent flow rate. With the aforementioned 25 wt. % solids in water and the solids being about 50 wt. % salt, product takeoff consisted of a solid saturated slurry of about 50 wt. % solids, the solids containing 98 weight % polymer and 2 weight % salt. The process of this invention thus has reduced the salt content of the PPS slurry significantly and has resulted in a product with an acceptable salt content.

Reasonable variations and modifications which will become apparent to those skilled in the art can be made in this invention without departing from the spirit and scope thereof.

What is claimed is:

1. Apparatus for cross-extracting a polymer slurry comprising
   (a) an essentially cylindrical housing confined by a wall,
   (b) at least one filter portion in said wall,
   (c) a filtrate receiver chamber associated with each filter portion,
   (d) an inlet conduit with a wash fluid outlet, said wash fluid outlet being located inside of said housing so that wash fluid injected will flow under a substantial angle with respect to the longitudinal axis of said housing to said filter portion,
   (e) a slurry removal conduit associated with the lower end of said housing, and
   (f) a slurry inlet conduit connecting the upper portion of said housing with a source of a polymer slurry.

2. Apparatus in accordance with claim 1 comprising a filtrate pressure controller associated with said filtrate receiver chamber and a wash fluid pressure controller associated with said wash fluid inlet conduit such as to establish a constant pressure differential between said wash fluid outlet and said filtrate receiver chamber.

3. Apparatus in accordance with claim 1 comprising pressure sensing means associated with the section of the housing downstream of the lowest filter portion, level sensing means to determine the location of the level between a settled bed of the slurry and a settling slurry and comprising controller means which open a valve in said slurry removal conduit responsive to the signals generated by said pressure sensing means and said level sensing means.

4. Apparatus in accordance with claim 3 wherein said level sensing means comprise a radio-frequency level controller.

5. Apparatus in accordance with claim 1 wherein said cylindrical housing has an essentially circular cross-section and wherein each filter portion is an annular filter portion and wherein each filtrate receiver chamber is an annular chamber surrounding said filter portion.

6. Apparatus in accordance with claim 2 comprising pressure sensing means associated with the section of the housing downstream of the lowest filter portion, level sensing means to determine the location of the level between a settled bed of the slurry and a settling slurry and comprising controller means which open a valve in said slurry removal conduit responsive to the signals generated by said pressure sensing means and said level sensing means.

7. Apparatus in accordance with claim 1 further comprising
   (g) a pressure controlled recycle loop for recycling said slurry from said slurry inlet conduit to said source of slurry in response to a pressure signal representative of the pressure in said slurry inlet conduit.

8. Apparatus for cross-extracting a polymer slurry comprising
   (a) an essentially circular cylindrical housing confined by a wall,
   (b) at least one filter portion in said wall, the length of said filter portion being from about 0.25 to about 1.5 times the diameter of said circular cylindrical housing,
   (c) a filtrate receiver chamber associated with said filter portion,
   (d) an inlet conduit with a wash fluid outlet, said wash fluid outlet being located inside of said housing so that wash fluid injected will flow under a substantial angle of 40° to 90° with respect to the longitudinal axis of said housing to said filter portion,
   (e) a slurry removal conduit associated with the lower end of said housing, and
   (f) a slurry inlet conduit connecting the upper portion of said housing with a source of a polymer slurry,
   with the further proviso that the top of said filter portion is located from about 0.5 to about 1 times the diameter of said circular cylindrical housing below the maximum height of a settled bed of said slurry.

* * * * *